United States Patent
Berggren et al.

(10) Patent No.: US 6,828,701 B1
(45) Date of Patent: Dec. 7, 2004

(54) SYNCHRONOUS MACHINE WITH POWER AND VOLTAGE CONTROL

(75) Inventors: Bertil Berggren, Vasteras (SE); Lars Gertmar, Vasteras (SE); Jan-Anders Nygren, Vasteras (SE); Tore Petersson, Vasteras (SE); Mats Leijon, Vasteras (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/355,728

(22) PCT Filed: Feb. 2, 1998

(86) PCT No.: PCT/SE96/00174

§ 371 (c)(1),
(2), (4) Date: Oct. 4, 1999

(87) PCT Pub. No.: WO98/34312

PCT Pub. Date: Aug. 6, 1998

(30) Foreign Application Priority Data

Feb. 3, 1997 (SE) ............................................... 9700367
Nov. 28, 1997 (SE) ............................................... 9704431

(51) Int. Cl.[7] .............................. H02H 7/06; H02K 3/40
(52) U.S. Cl. ............... 310/68 C; 322/34; 174/DIG. 19; 174/DIG. 29
(58) Field of Search .............................. 310/68 C, 179, 310/180, 184, 196, 208; 322/33, 34; 174/DIG. 13–DIG. 33; 290/40 A–40 B; 318/805, 808, 810

(56) References Cited

U.S. PATENT DOCUMENTS

| | | |
|---|---|---|
| 681,800 A | 9/1901 | Lasche |
| 1,304,451 A | 5/1919 | Burnham |
| 1,418,856 A | 6/1922 | Williamson |
| 1,481,585 A | 1/1924 | Beard |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |

(List continued on next page.)

FOREIGN PATENT DOCUMENTS

| | | |
|---|---|---|
| AT | 399790 | 7/1995 |
| BE | 565063 | 2/1957 |
| CH | 391071 | 4/1965 |

(List continued on next page.)

OTHER PUBLICATIONS

Shipboard Electrical Insulation; G. L. Moses, 1951, pp. 2&3.
ABB Elkrafthandbok; ABB AB; 1988 ; pp274–276.
Elkraft teknisk Handbok, 2 Elmaskiner, A. Alfredsson et al; 1998, pp 121–123.

(List continued on next page.)

Primary Examiner—Burton Mullins
(74) Attorney, Agent, or Firm—Dykema Gossett PLLC

(57) ABSTRACT

A synchronous machine for power and/or voltage control comprises a stator with a stator winding and a rotor with a field winding. The stator winding comprises a high-voltage cable with solid insulation. A rotor has a thermally based rotor current limit intersecting with a thermally based stator current limit in a capability graph at a power factor considerably below the rated power factor or has the thermally based rotor current limit above the thermally based stator current limit. In the capability graph. Means are provided for limiting the currents in order to avoid thermal damage. In a method for power and/or voltage control of such a synchronous machine, the machine operates with the stator current exceeding the thermally based stator current limit for a certain time period less than the maxim an permissible time limit, whereafter the overload is reduced by reduction of either the active power or the field current or a combination of both.

39 Claims, 5 Drawing Sheets

U.S. PATENT DOCUMENTS

Figure 1:
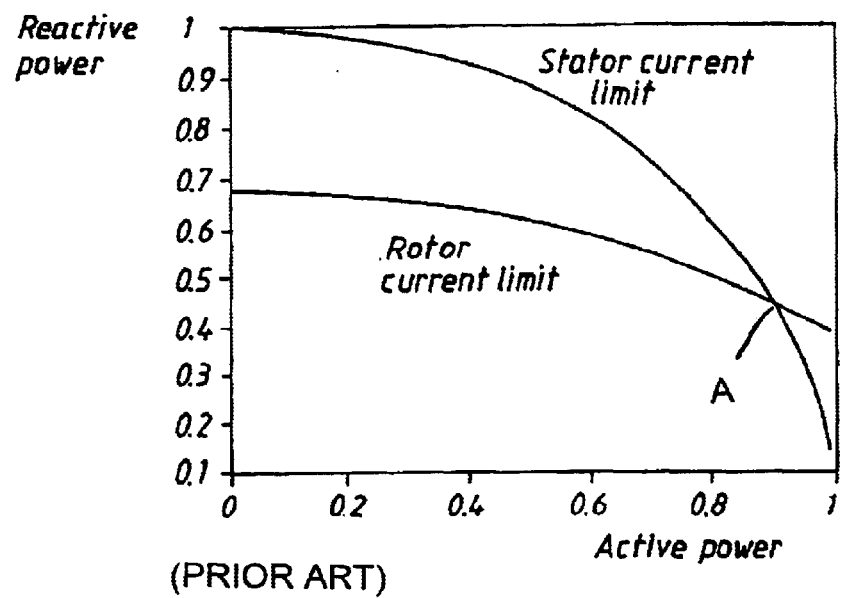

| | | |
|---|---|---|
| 1,781,308 A | 11/1930 | Vos |
| 1,861,182 A | 5/1932 | Hendey et al. |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,415,652 A | 2/1947 | Norton |
| 2,424,443 A | 7/1947 | Evans |
| 2,436,306 A | 2/1948 | Johnson |
| 2,446,999 A | 8/1948 | Camilll |
| 2,459,322 A | 1/1949 | Johnston |
| 2,462,651 A | 2/1949 | Lord |
| 2,498,238 A | 2/1950 | Berberich et al. |
| 2,721,905 A | 10/1955 | Monroe |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,560,777 A | 2/1971 | Moeller |
| 3,593,123 A | 7/1971 | Williamson |
| 3,631,519 A | 12/1971 | Salahshourian |
| 3,644,662 A | 2/1972 | Salahshourian |
| 3,651,402 A | 3/1972 | Leffmann |
| 3,670,192 A | 6/1972 | Andersson et al. |
| 3,675,056 A | 7/1972 | Lenz |
| 3,684,821 A | 8/1972 | Miyauchi et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,792,399 A | 2/1974 | McLyman |
| 3,801,843 A | 4/1974 | Corman et al. |
| 3,809,933 A | 5/1974 | Sugawara et al. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,995,785 A | 12/1976 | Arick et al. |
| 4,001,616 A | 1/1977 | Lonseth et al. |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A | 12/1981 | Schuler |
| 4,308,575 A | 12/1981 | Mase |
| 4,310,966 A | 1/1982 | Breitenbach |
| 4,317,001 A | 2/1982 | Silver et al. |
| 4,320,645 A | 3/1982 | Stanley |
| 4,321,518 A | 3/1982 | Akamatsu |
| 4,330,726 A | 5/1982 | Albright et al. |
| 4,337,922 A | 7/1982 | Streiff et al. |
| 4,341,989 A | 7/1982 | Sandberg et al. |
| 4,347,449 A | 8/1982 | Beau |
| 4,347,454 A | 8/1982 | Gellert et al. |
| 4,353,612 A | 10/1982 | Meyers |
| 4,357,542 A | 11/1982 | Kirschbaum |
| 4,360,748 A | 11/1982 | Raschbichler et al. |
| 4,367,425 A | 1/1983 | Mendelsohn et al. |
| 4,368,418 A | 1/1983 | Demello et al. |
| 4,369,389 A | 1/1983 | Lambrecht |
| 4,371,745 A | 2/1983 | Sakashita |
| 4,387,316 A | 6/1983 | Katsekas |
| 4,403,163 A | 9/1983 | Armerding et al. |

| | | | | | | |
|---|---|---|---|---|---|---|
| 4,404,486 A | 9/1983 | Keim et al. | | 5,097,241 A | 3/1992 | Smith et al. |
| 4,411,710 A | 10/1983 | Mochizuki et al. | | 5,097,591 A | 3/1992 | Wcislo et al. |
| 4,421,284 A | 12/1983 | Pan | | 5,111,095 A | 5/1992 | Hendershot |
| 4,425,521 A | 1/1984 | Rosenberry, Jr. et al. | | 5,124,607 A | 6/1992 | Rieber et al. |
| 4,426,771 A | 1/1984 | Wang et al. | | 5,136,459 A | 8/1992 | Fararooy |
| 4,429,244 A | 1/1984 | Nikiten et al. | | 5,140,290 A | 8/1992 | Dersch |
| 4,431,960 A | 2/1984 | Zucker | | 5,153,460 A | 10/1992 | Bovino et al. |
| 4,443,725 A | 4/1984 | Derderian et al. | | 5,168,662 A | 12/1992 | Nakamura et al. |
| 4,470,884 A | 9/1984 | Carr | | 5,187,428 A | 2/1993 | Hutchison et al. |
| 4,473,765 A | 9/1984 | Butman, Jr. et al. | | 5,235,488 A | 8/1993 | Koch |
| 4,475,075 A | 10/1984 | Munn | | 5,246,783 A | 9/1993 | Spenadel et al. |
| 4,477,690 A | 10/1984 | Nikitin et al. | | 5,264,778 A | 11/1993 | Kimmel et al. |
| 4,481,438 A | 11/1984 | Keim | | 5,304,883 A | 4/1994 | Denk |
| 4,488,079 A | 12/1984 | Dailey et al. | | 5,305,961 A | 4/1994 | Errard et al. |
| 4,503,284 A | 3/1985 | Minnick et al. | | 5,321,308 A | 6/1994 | Johncock |
| 4,510,077 A | 4/1985 | Elton | | 5,323,330 A | 6/1994 | Asplund et al. |
| 4,517,471 A | 5/1985 | Sachs | | 5,325,008 A | 6/1994 | Grant |
| 4,523,249 A | 6/1985 | Arimoto | | 5,327,637 A | 7/1994 | Britenbach et al. |
| 4,538,131 A | 8/1985 | Baier et al. | | 5,341,281 A | 8/1994 | Skibinski |
| 4,546,210 A | 10/1985 | Akiba et al. | | 5,343,139 A | 8/1994 | Gyugyi et al. |
| 4,551,780 A | 11/1985 | Canay | | 5,355,046 A | 10/1994 | Weigelt |
| 4,557,038 A | 12/1985 | Wcislo et al. | | 5,365,132 A | 11/1994 | Hann et al. |
| 4,560,896 A | 12/1985 | Vogt et al. | | 5,387,890 A | 2/1995 | Estop et al. |
| 4,565,929 A | 1/1986 | Baskin et al. | | 5,397,513 A | 3/1995 | Steketee, Jr. |
| 4,588,916 A | 5/1986 | Lis | | 5,400,005 A | 3/1995 | Bobry |
| 4,590,416 A | 5/1986 | Porche et al. | | 5,452,170 A | 9/1995 | Ohde et al. |
| 4,594,630 A | 6/1986 | Rabinowitz et al. | | 5,468,916 A | 11/1995 | Litenas et al. |
| 4,607,183 A | 8/1986 | Rieber et al. | | 5,500,632 A | 3/1996 | Halser, III |
| 4,615,109 A | 10/1986 | Wcislo et al. | | 5,510,942 A | 4/1996 | Bock et al. |
| 4,618,795 A | 10/1986 | Cooper et al. | | 5,530,307 A | 6/1996 | Horst |
| 4,619,040 A | 10/1986 | Wang et al. | | 5,545,853 A | 8/1996 | Hildreth |
| 4,622,116 A * | 11/1986 | Elton et al. .................. 204/181 | | 5,550,410 A | 8/1996 | Titus |
| 4,633,109 A | 12/1986 | Feigel | | 5,583,387 A | 12/1996 | Takeuchi et al. |
| 4,650,924 A | 3/1987 | Kauffman et al. | | 5,587,126 A | 12/1996 | Steketee, Jr. |
| 4,656,316 A | 4/1987 | Meltsch | | 5,598,137 A | 1/1997 | Alber et al. |
| 4,656,379 A | 4/1987 | McCarty | | 5,607,320 A | 3/1997 | Wright |
| 4,677,328 A | 6/1987 | Kumakura | | 5,612,510 A | 3/1997 | Hildreth |
| 4,687,882 A | 8/1987 | Stone et al. | | 5,663,605 A | 9/1997 | Evans et al. |
| 4,692,731 A | 9/1987 | Osinga | | 5,672,926 A | 9/1997 | Brandes et al. |
| 4,723,104 A | 2/1988 | Rohatyn | | 5,689,223 A | 11/1997 | Demarmels et al. |
| 4,737,704 A | 4/1988 | Kalinnikov et al. | | 5,807,447 A | 9/1998 | Forrest |
| 4,745,314 A | 5/1988 | Nakano | | 5,902,958 A * | 5/1999 | Haxton ........................ 174/47 |
| 4,766,365 A | 8/1988 | Bolduc et al. | | | | |
| 4,785,138 A | 11/1988 | Brietenbach et al. | | FOREIGN PATENT DOCUMENTS | | |
| 4,795,933 A | 1/1989 | Sakai | | | | |
| 4,827,172 A | 5/1989 | Kobayashi | | CH | 534448 | 2/1973 |
| 4,845,308 A | 7/1989 | Womack, Jr. et al. | | CH | 539328 | 7/1973 |
| 4,847,747 A | 7/1989 | Abbondanti | | CH | 657482 | 8/1986 |
| 4,853,565 A * | 8/1989 | Elton et al. .................. 310/45 | | DE | 40414 | 6/1887 |
| 4,859,810 A | 8/1989 | Cloetens et al. | | DE | 277012 | 7/1914 |
| 4,860,430 A | 8/1989 | Raschbichler et al. | | DE | 336418 | 6/1920 |
| 4,864,266 A | 9/1989 | Feather et al. | | DE | 372390 | 3/1923 |
| 4,883,230 A | 11/1989 | Lindstrom | | DE | 387973 | 1/1924 |
| 4,894,284 A | 1/1990 | Yamanouchi et al. | | DE | 425551 | 2/1926 |
| 4,914,386 A | 4/1990 | Zocholl | | DE | 426793 | 3/1926 |
| 4,918,347 A | 4/1990 | Takaba | | DE | 432169 | 7/1926 |
| 4,918,835 A | 4/1990 | Raschbichler et al. | | DE | 433749 | 9/1926 |
| 4,924,342 A | 5/1990 | Lee | | DE | 435608 | 10/1926 |
| 4,926,079 A | 5/1990 | Niemela et al. | | DE | 435609 | 10/1926 |
| 4,942,326 A | 7/1990 | Butler, III et al. | | DE | 441717 | 3/1927 |
| 4,949,001 A | 8/1990 | Campbell | | DE | 443011 | 4/1927 |
| 4,994,952 A | 2/1991 | Silva et al. | | DE | 460124 | 5/1928 |
| 4,997,995 A | 3/1991 | Simmons et al. | | DE | 482506 | 9/1929 |
| 5,012,125 A | 4/1991 | Conway | | DE | 501181 | 7/1930 |
| 5,036,165 A | 7/1991 | Elton et al. | | DE | 523047 | 4/1931 |
| 5,036,238 A | 7/1991 | Tajima | | DE | 568508 | 1/1933 |
| 5,066,881 A | 11/1991 | Elton et al. | | DE | 572030 | 3/1933 |
| 5,067,046 A | 11/1991 | Elton et al. | | DE | 584639 | 9/1933 |
| 5,083,360 A | 1/1992 | Valencic et al. | | DE | 586121 | 10/1933 |
| 5,086,246 A | 2/1992 | Dymond et al. | | DE | 604972 | 11/1934 |
| 5,094,703 A * | 3/1992 | Takaoka et al. ............ 148/260 | | DE | 629301 | 4/1936 |
| | | | | DE | 673545 | 3/1939 |

| | | | | | |
|---|---|---|---|---|---|
| DE | 719009 | 3/1942 | EP | 0684679 | 11/1995 |
| DE | 846583 | 8/1952 | EP | 0684682 | 11/1995 |
| DE | 875227 | 4/1953 | EP | 0695019 | 1/1996 |
| DE | 1807391 | 5/1970 | EP | 0732787 | 9/1996 |
| DE | 2050674 | 5/1971 | EP | 0738034 | 10/1996 |
| DE | 1638176 | 6/1971 | EP | 0740315 | 10/1996 |
| DE | 2155371 | 5/1973 | EP | 0751605 | 1/1997 |
| DE | 2400698 | 7/1975 | EP | 0780926 | 6/1997 |
| DE | 2520511 | 11/1976 | EP | 0802542 | 10/1997 |
| DE | 2656389 | 6/1978 | FR | 805544 | 4/1936 |
| DE | 2721905 | 11/1978 | FR | 841351 | 1/1938 |
| DE | 137164 | 8/1979 | FR | 847899 | 12/1938 |
| DE | 138840 | 11/1979 | FR | 1011924 | 4/1949 |
| DE | 2824951 | 12/1979 | FR | 1126975 | 3/1955 |
| DE | 2835386 | 2/1980 | FR | 1238795 | 7/1959 |
| DE | 2839517 | 3/1980 | FR | 2108171 | 5/1972 |
| DE | 2854520 | 6/1980 | FR | 2251938 | 6/1975 |
| DE | 3009102 | 9/1980 | FR | 2305879 | 10/1976 |
| DE | 2913697 | 10/1980 | FR | 2376542 | 7/1978 |
| DE | 2920478 | 12/1980 | FR | 2467502 | 4/1981 |
| DE | 3028777 | 3/1981 | FR | 2556146 | 6/1985 |
| DE | 2939004 | 4/1981 | FR | 2594271 | 8/1987 |
| DE | 3006382 | 8/1981 | FR | 2708157 | 1/1995 |
| DE | 3008818 | 9/1981 | GB | 123906 | 3/1919 |
| DE | 3305225 | 8/1984 | GB | 268271 | 3/1927 |
| DE | 3309051 | 9/1984 | GB | 293861 | 11/1928 |
| DE | 3441311 | 5/1986 | GB | 292999 | 4/1929 |
| DE | 3543106 | 6/1987 | GB | 319313 | 7/1929 |
| DE | 2917717 | 8/1987 | GB | 518993 | 3/1940 |
| DE | 3612112 | 10/1987 | GB | 537609 | 6/1941 |
| DE | 3726346 | 2/1989 | GB | 540456 | 10/1941 |
| DE | 4023903 | 11/1991 | GB | 589071 | 6/1947 |
| DE | 4022476 | 1/1992 | GB | 685416 | 1/1953 |
| DE | 4233558 | 3/1994 | GB | 702892 | 1/1954 |
| DE | 4409794 | 8/1995 | GB | 715226 | 9/1954 |
| DE | 4412761 | 10/1995 | GB | 723457 | 2/1955 |
| DE | 4420322 | 12/1995 | GB | 763761 | 12/1956 |
| DE | 19547229 | 6/1997 | GB | 805721 | 12/1958 |
| EP | 049104 | 4/1982 | GB | 827600 | 2/1960 |
| EP | 0493704 | 4/1982 | GB | 854728 | 11/1960 |
| EP | 0056580 A1 | 7/1982 | GB | 870583 | 6/1961 |
| EP | 078908 | 5/1983 | GB | 913386 | 12/1962 |
| EP | 0120154 | 10/1984 | GB | 965741 | 8/1964 |
| EP | 0130124 | 1/1985 | GB | 992249 | 5/1965 |
| EP | 0142813 | 5/1985 | GB | 1024583 | 3/1966 |
| EP | 0155405 | 9/1985 | GB | 1053337 | 12/1966 |
| EP | 0174783 | 3/1986 | GB | 1059123 | 2/1967 |
| EP | 0234521 | 9/1987 | GB | 1103098 | 2/1968 |
| EP | 0244069 | 11/1987 | GB | 1103099 | 2/1968 |
| EP | 0246377 | 11/1987 | GB | 1117401 | 6/1968 |
| EP | 0265868 | 5/1988 | GB | 1135242 | 12/1968 |
| EP | 0274691 | 7/1988 | GB | 1147049 | 4/1969 |
| EP | 0280759 | 9/1988 | GB | 1157885 | 7/1969 |
| EP | 0282876 | 9/1988 | GB | 1174659 | 12/1969 |
| EP | 0309096 | 3/1989 | GB | 1236082 | 6/1971 |
| EP | 0314860 | 5/1989 | GB | 1268770 | 3/1972 |
| EP | 0316911 | 5/1989 | GB | 1319257 | 6/1973 |
| EP | 0317248 | 5/1989 | GB | 1322433 | 7/1973 |
| EP | 0335430 | 10/1989 | GB | 1340983 | 12/1973 |
| EP | 0342554 | 11/1989 | GB | 1341050 | 12/1973 |
| EP | 0375101 | 6/1990 | GB | 1365191 | 8/1974 |
| EP | 0406437 | 1/1991 | GB | 1395152 | 5/1975 |
| EP | 0439410 | 7/1991 | GB | 1424982 | 2/1976 |
| EP | 0440865 | 8/1991 | GB | 1426594 | 3/1976 |
| EP | 0490705 | 6/1992 | GB | 1438610 | 6/1976 |
| EP | 0571155 | 11/1993 | GB | 1445284 | 8/1976 |
| EP | 0620570 | 10/1994 | GB | 1479904 | 7/1977 |
| EP | 0642027 | 3/1995 | GB | 1493163 | 11/1977 |
| EP | 0671632 | 9/1995 | GB | 1502938 | 3/1978 |
| EP | 0676777 | 10/1995 | GB | 1525745 | 9/1978 |
| EP | 0677915 | 10/1995 | GB | 2000625 | 1/1979 |

| | | | | | | |
|---|---|---|---|---|---|---|
| GB | 1548633 | 7/1979 | | WO | WO9622607 | 7/1996 |
| GB | 2046142 | 11/1979 | | WO | WO9630144 | 10/1996 |
| GB | 2022327 | 12/1979 | | WO | WO9710640 | 3/1997 |
| GB | 2025150 | 1/1980 | | WO | WO9711831 | 4/1997 |
| GB | 2034101 | 5/1980 | | WO | WO9716881 | 5/1997 |
| GB | 1574796 | 9/1980 | | WO | WO9745288 | 12/1997 |
| GB | 2070341 | 9/1981 | | WO | WO9745847 | 12/1997 |
| GB | 2070470 | 9/1981 | | WO | WO9745848 | 12/1997 |
| GB | 2071433 | 9/1981 | | WO | WO9745906 | 12/1997 |
| GB | 2081523 | 2/1982 | | WO | WO9745907 | 12/1997 |
| GB | 2099635 | 12/1982 | | WO | WO9745912 | 12/1997 |
| GB | 2105925 | 3/1983 | | WO | WO9745914 | 12/1997 |
| GB | 2106306 | 4/1983 | | WO | WO9745915 | 12/1997 |
| GB | 2106721 | 4/1983 | | WO | WO9745916 | 12/1997 |
| GB | 2136214 | 9/1984 | | WO | WO9745918 | 12/1997 |
| GB | 2140195 | 11/1984 | | WO | WO9745919 | 12/1997 |
| GB | 2268337 | 1/1994 | | WO | WO9745920 | 12/1997 |
| GB | 2273819 | 6/1994 | | WO | WO9745921 | 12/1997 |
| GB | 2283133 | 4/1995 | | WO | WO9745922 | 12/1997 |
| GB | 2289992 | 12/1995 | | WO | WO9745923 | 12/1997 |
| GB | 2308490 | 6/1997 | | WO | WO9745924 | 12/1997 |
| JP | 60206121 | 3/1959 | | WO | WO9745925 | 12/1997 |
| JP | 57043529 | 8/1980 | | WO | WO9745926 | 12/1997 |
| JP | 59076156 | 10/1982 | | WO | WO9745927 | 12/1997 |
| JP | 59159642 | 2/1983 | | WO | WO9745928 | 12/1997 |
| JP | 6264964 | 9/1985 | | WO | WO9745929 | 12/1997 |
| JP | 1129737 | 5/1989 | | WO | WO9745930 | 12/1997 |
| JP | 3245748 | 2/1990 | | WO | WO9745931 | 12/1997 |
| JP | 4179107 | 11/1990 | | WO | WO9745932 | 12/1997 |
| JP | 318253 | 1/1991 | | WO | WO9745933 | 12/1997 |
| JP | 424909 | 1/1992 | | WO | WO9745934 | 12/1997 |
| JP | 5290947 | 4/1992 | | WO | WO9745935 | 12/1997 |
| JP | 6196343 | 12/1992 | | WO | WO9745936 | 12/1997 |
| JP | 6233442 | 2/1993 | | WO | WO9745937 | 12/1997 |
| JP | 6325629 | 5/1993 | | WO | WO9745938 | 12/1997 |
| JP | 7057951 | 8/1993 | | WO | WO9745939 | 12/1997 |
| JP | 7264789 | 3/1994 | | WO | WO9747067 | 12/1997 |
| JP | 8167332 | 12/1994 | | WO | WO9820595 | 5/1998 |
| JP | 8264039 | 11/1995 | | WO | WO9820596 | 5/1998 |
| JP | 9200989 | 1/1996 | | WO | WO9820597 | 5/1998 |
| LU | 67199 | 3/1972 | | WO | WO 98/20598 | 5/1998 |
| SE | 90308 | 9/1937 | | WO | WO9820600 | 5/1998 |
| SE | 305899 | 11/1968 | | WO | WO 98/20602 | 5/1998 |
| SE | 255156 | 2/1969 | | WO | WO9821385 | 5/1998 |
| SE | 341428 | 12/1971 | | WO | WO9827634 | 6/1998 |
| SE | 453236 | 1/1982 | | WO | WO9827635 | 6/1998 |
| SE | 457792 | 6/1987 | | WO | WO9827636 | 6/1998 |
| SE | 502417 | 12/1993 | | WO | WO 98/34239 | 6/1998 |
| SU | 792302 | 1/1971 | | WO | WO9834315 | 6/1998 |
| SU | 425268 | 9/1974 | | WO | WO9829927 | 7/1998 |
| SU | 1019553 | 1/1980 | | WO | WO9829928 | 7/1998 |
| SU | 694939 | 1/1982 | | WO | WO9829929 | 7/1998 |
| SU | 955369 | 8/1983 | | WO | WO9829930 | 7/1998 |
| SU | 1511810 | 5/1987 | | WO | WO9829931 | 7/1998 |
| WO | WO8202617 | 8/1982 | | WO | WO9829932 | 7/1998 |
| WO | WO8502302 | 5/1985 | | WO | WO9833731 | 8/1998 |
| WO | WO9011389 | 10/1990 | | WO | WO9833736 | 8/1998 |
| WO | WO9012409 | 10/1990 | | WO | WO9833737 | 8/1998 |
| WO | WO9101059 | 1/1991 | | WO | WO9834238 | 8/1998 |
| WO | WO9101585 | 2/1991 | | WO | WO9834240 | 8/1998 |
| WO | WO9107807 | 3/1991 | | WO | WO9834241 | 8/1998 |
| WO | WO9109442 | 6/1991 | | WO | WO9834242 | 8/1998 |
| WO | WO8115862 | 10/1991 | | WO | WO9834243 | 8/1998 |
| WO | WO9201328 | 1/1992 | | WO | WO9834244 | 8/1998 |
| WO | WO9203870 | 3/1992 | | WO | WO9834245 | 8/1998 |
| WO | WO9321681 | 10/1993 | | WO | WO9834246 | 8/1998 |
| WO | WO9406194 | 3/1994 | | WO | WO9834247 | 8/1998 |
| WO | WO9518058 | 7/1995 | | WO | WO9834248 | 8/1998 |
| WO | WO9522153 | 8/1995 | | WO | WO9834249 | 8/1998 |
| WO | WO9524049 | 9/1995 | | WO | WO9834250 | 8/1998 |
| WO | WO9622606 | 7/1996 | | WO | WO9834309 | 8/1998 |

| | | |
|---|---|---|
| WO | WO9834312 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K. Bienick, KSB; Feb. 25, 1988; pp9–17.

High Voltage Generators; G. Beschastnov et al; 1977; vol. 48, No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; 6/21–27/77; Section 1. Paper #18.

Manufacture and Testing of Roebel bars; P. Marti et al; 1960, Pub. 86, vol. 8, pp25–31.

Hydroalternators of 110 to 220 kV Elektrotechn. Obz., vol. 64, No. 3, pp32–136 Mar. 1975; A. Abramov.

Design Concepts for an Amorphous Metal Distribution Transformer, E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp35–40, 1988.

Zur Entwicklung der Tauchpumpenmotoren; A. Schanz; KSB, pp. 19–24.

Direct Generation of alternating current at high voltages; R. Parsons; IEEE Journal, vol. 67 #393, 1/15/29; pp1065–1080.

Stopfbachslose Umwalzpumpen– ein Wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931, pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfbcichsloser Pumpen; E. Picmaus; Electrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable;Ichihara et al; 8/92; pp3–6.

Underground Transmission Systems Reference Book; 1992;pp16–19; pp36–45; pp67–81.

Power System Stability and Control; P. Kundur, 1994; pp23–25; p767.

Six phase Synchronous Machine with AC and DC Stator Connections, Part II:Harmonic Studies and a proposed Uninterruptible Power Supply Scheme; R. Schiferi et al.;Aug. 1983 pp 2694–2701.

Six phase Synchronous Machine with AC and DC Stator Connections, Part 1: Equivalent circuit representation and Steady–State Analysis; R. Schiferi et al.; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 60kV; G. Aicholzer; Sep. 1974, pp249–255.

Advanced Turbine–generators– an assessment; A. Appleton, et al; International Conf. Proceedings, Lg HV Elec. Sys. Paris, FR, Aug.–Sep./1976, vol. 1, Section 11–02, p. 1–9.

Fully slotless turbogenerators; E. Spooner, Proc., IEEE vol. 120 #12, Dec. 1973.

Toroidal winding geometry for high voltage superconducting alternators; J. Kirtley et al; MIT—Elec. Poewr Sys. Engrg. Lab for IEEE PES;Feb. 1974.

High–Voltage Stator Winding Development; D. Albright et al; Proj. Report EL339, Project 1716, Apr. 1984.

PowerFormer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

* cited by examiner

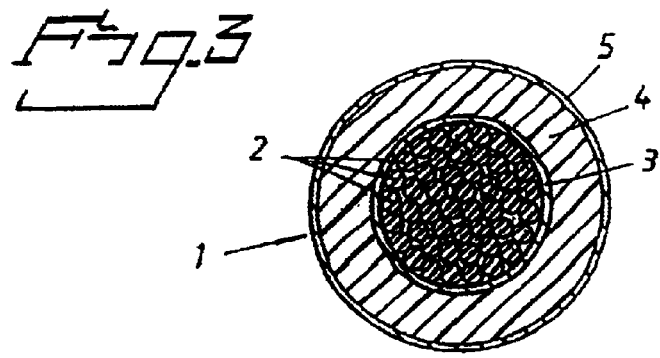
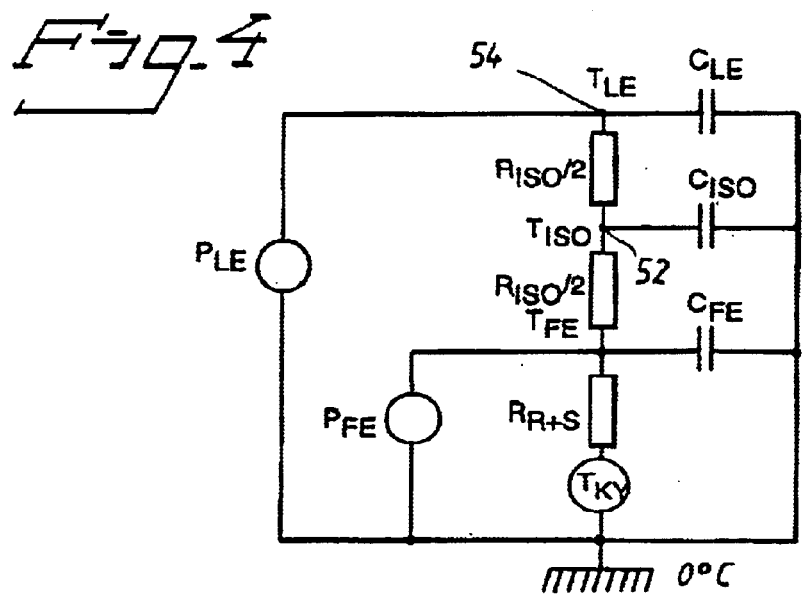
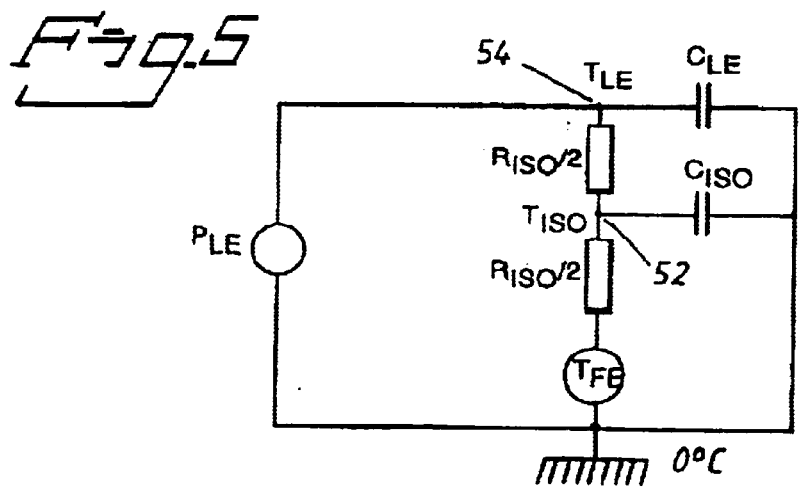

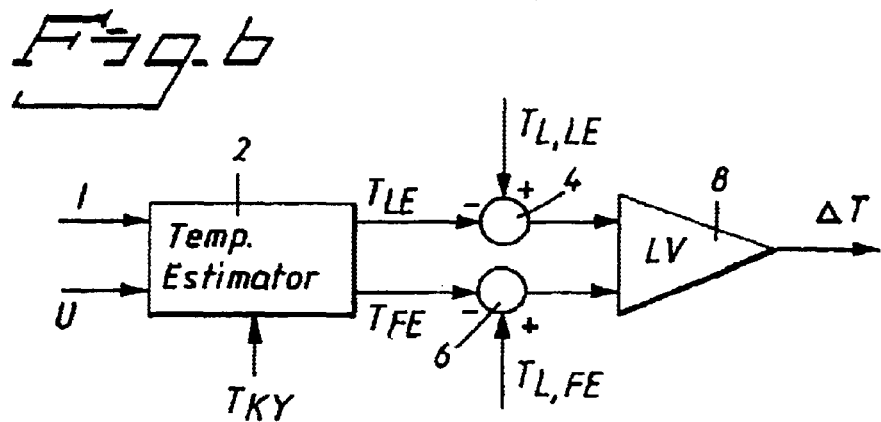
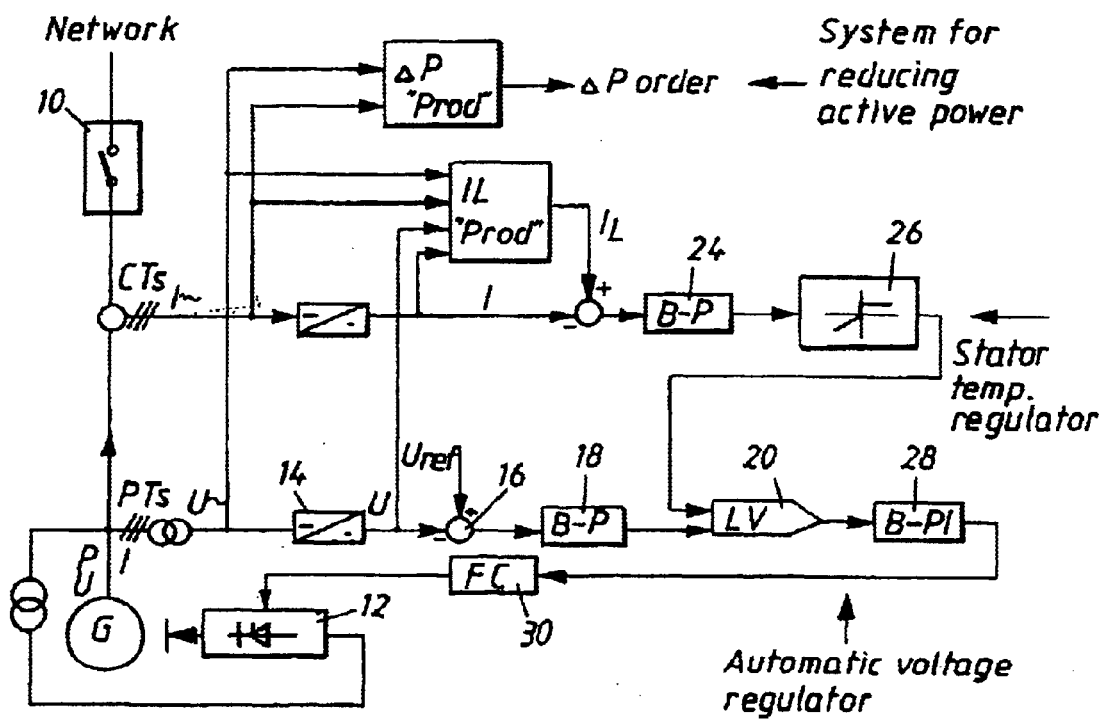

SYNCHRONOUS MACHINE WITH POWER AND VOLTAGE CONTROL

The present invention relates to a method for power and/or voltage control in a synchronous machine, and a synchronous machine for power and/or voltage control.

In the following "synchronous machine" shall be taken to mean synchronous generator. Synchronous generators are used in electric power networks in the first place to supply active and reactive power in the "hour scale". Active power can also be controlled in the "second-minute scale" (frequency control), as well as reactive power (voltage control). Synchronous machines also provide suitable contributions in the "millisecond scale" to the fault currents, so that error states in the network can be quickly resolved in selective manner.

Synchronous machines are important production sources of reactive power in power systems. When the reactive power requirement increases in the system, this tends to lower the terminal voltage on the synchronous machine. To keep the voltage constant, the field current is normally increased by means of the voltage regulator of the synchronous machine. The synchronous machine will thus produce the reactive power required to achieve reactive power balance at the desired terminal voltage.

The above mentioned process applies as long as the power production corresponds to one point in the permissible area in the capability graph of the synchronous machine, i.e. the graph of limits as regards reactive and active power, see FIG. 1 showing the relationship at overexcited operation. At overexcited operation, i.e. when the synchronous machine is producing reactive power, the permissible operating area is limited by thermally based rotor and stator current limits. The synchronous machines of today are normally dimensioned so that rotor and stator current limits intersect each other at a point at rated power factor A, see FIG. 1. The rated power factor for synchronous generators is typically 0.8–0.95. At overexcited operation, where the power factor is greater than the rated power factor, the limit for the capability graph of the synchronous machine consists of the stator current limit and, at overexcited operation, where the power factor is less than the rated power factor, the limit consists of the rotor current limit.

In conventional technology, if the stator or rotor current limits are exceeded current limiters, if such are installed and used, come into operation. These limiters reduce the currents by lowering the excitation. Since it takes a certain time before damaging temperatures are obtained, intervention of the current limiters of the stator or rotor is delayed several seconds before the current is lowered. The delay typically depends on the size of the current but it is usually less than one minute, see e.g. VERIFICATION OF LIMITER PERFORMANCE IN MODERN EXCITATION CONTROL SYSTEMS in IEEE Transaction on Energy Conversion, Vol. 10, No. 3, September 1995. The current reduction is achieved by a decrease in the field current which results in a decrease in the terminal voltage and reactive power production of the generator. The consequences for the part of the system in the vicinity of the machine are that the local reactive power production decreases and that it is more difficult to import power from adjacent parts of the system, when the voltage drops.

If the transmission network is unable to transmit the power required at prevailing voltages there is a risk of the power system being subjected to voltage collapse. To avoid this it is advantageous for the power to be produced locally, close to the load. If this is not possible, and the power must be transmitted from other parts of the system, it is, as known, advantageous if this can be done at as high a voltage level as possible. When the voltage drops, the reactive power production (shunt capacitances) of the transmission lines decrease. Transformer tap-changers act in order to keep the voltages to the loads constant, and thus the power of the loads constant. If the power consumption of the loads is constant and the transmission voltage is lower than normally, the currents in the transmission lines will be higher and the reactive power consumption of the transmission lines will be greater (series inductances), see Cigré brochure 101, October 1995.

In many power systems, if current limiters come into operation for certain synchronous machines as described above, the reactive power production is limited and this may lead to a voltage collapse of the system.

In normal operation of the power system, with an essentially intact network, these situations are normally avoided by the installation of additional reactive power production resources, e.g. mechanically switched shunt capacitors and/or thyristor controlled static var compenstors (SVC), if necessary. However, as a widespread voltage collapse usually has severe consequences for the society, also abnormal operating conditions needs to be considered. If the network is weakened, due to e.g. faults or maintenance on important elements of the network, the installed reactive power producing resources may no longer be sufficient, resulting in the above described situation which may lead to voltage collapse. The cost of installing additional controllable reactive power producing resources, e.g. SVC devices, such that also these abnormal operating conditions can be handled is considerable. There is consequently a need for inexpensive controllable reactive power production reserves. These reserve resources should be capable of delivering reactive power such that voltage can be maintained at prescribed levels for at least 10 to 20 minutes giving the system operators a chance to take preventive actions, such as e.g. starting gas turbines or shedding load.

In power systems known today, or in power plants, the energy conversion usually occurs in two stages, using a step-up transformer. The rotating synchronous machine and the transformer, each have a magnetic circuit. It is known that manufacturers of such equipment are cautious and conservative in their recommendations for the set values in the limit devices, see Cigré brochure 101, October 1995, section 4.5.4., page 60. Coordination is required and a certain risk of conflict thus exists in dimensioning and protecting generators and transformers. The step-up transformer has no air gap and is therefore sensitive to saturation as a result of high voltage or geomagnetic currents. The transformer also consumes part of the reactive power of the generator, both at normal and abnormal operation. The majority of the active losses appear in the conductors of the armature circuit and the step-up transformer, while the core losses are relatively small in both devices. One complication here is that the losses are normally developed at medium and high voltage and are therefore more difficult to cool away than if they had been developed at earth potential.

The object of the present invention is to achieve a synchronous machine for power and/or voltage control and a method for power and/or voltage control in order to avoid voltage collapse in power systems.

Figure 2:
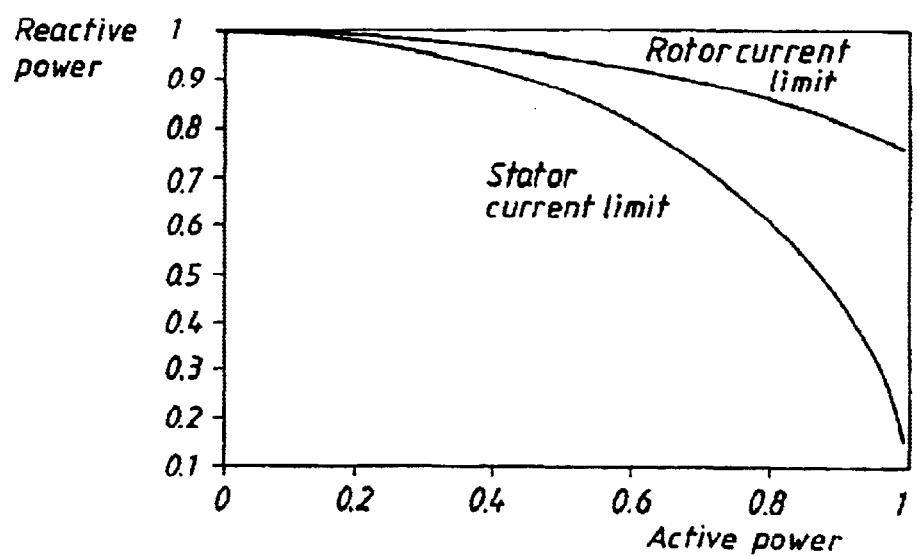

According to the invention, thus, the synchronous machine is designed so that the thermally based rotor current limit is raised with respect to the thermally based stator current limit such that either the intersection with the thermally based stator current limit in the capability graph is at a power factor value considerably below power factor value, or the rotor current limit is raised above the stator current limit such that the two limits do not intersect. If the rotor and stator current limits intersect at the power factor zero in the capability graph as shown in FIG. 2, or if the rotor current limit is raised above the stator current limit, the stator current limit will be limiting for all overexcited operation.

In the following "cable" shall refer to high-voltage, insulated electric conductors comprising a core having a number of strand parts of conducting material such as copper, for instance, an inner semiconducting layer surrounding the core, a high-voltage insulating layer surrounding the inner semiconducting layer, and an outer semiconducting layer surrounding the insulating layer. A synchronous machine with a stator winding which comprises this type of cable can be designed for direct connection to the power network at higher voltages than with conventional machines, thus eliminating the need for a step-up transformer. In the case of reactive power production it is advantageous to use a machine designed for direct connection to transmission level, since the reactive power consumed in the step-up transformer in the conventional plant instead can be delivered to the power network with a machine according to the invention.

The advantages of the invention are particularly noticeable in a machine wound with a cable of the type described above, particularly a cable having a diameter within the interval 20–200 mm and a conducting area within the interval 80–3000 $mm^2$. Such applications of the invention thus constitute preferred embodiments thereof.

Raising the rotor current limit has a number of advantages for a synchronous machine. It enables direct measurement of limiting stator temperatures, for instance. This is considerably more difficult if the limiting temperatures are located in the rotor since it is difficult to measure, or in any other way communicate with a rotating object. Furthermore, reducing active power enables more reactive power to be produced. This is also possible with conventional rotor dimensioning but more MVAr per reduced MW results in this case, as can be seen in the curves in FIGS. 1 and 2.

A number of other advantages are also gained by raising the rotor current limit, specific to this type of machine. The time constants for heating (and cooling) the stator are large in comparison with a conventional machine. This means that the machine, with conventional stator current limiters, can be run overloaded or longer than a conventional machine without damaging temperatures being reached. Simulations indicate that the stator safely can be overloaded 80% for 15 minutes in some cases. This extended time period can be utilized to take action either to reduce the system's need for reactive power, or to increase the production of reactive power. It is also easier to implement forced cooling of the stator of the machine. A machine of this type has a degree of efficiency comparable with that of a conventional machine, i.e. the stator losses are approximately equivalent. While a conventional machine has primarily conductor losses, this type of machine has less conductor losses and more core losses. Since the core losses are developed at earth potential they are easier to cool away. A cooling machine can be used, for instance, for forced cooling in situations with high core temperatures.

With conventional current limiters the time period contributed by the time constant for heating, can be utilized to reduce the active power and thus enable increased and/or prolonged production of reactive power. The need for reducing the field is thus less and, in the best case, is eliminated.

With direct temperature measurement or temperature estimation (or a combination thereof) we can pass from using the term "stator current limit" to talking about stator temperature limit(s). Since it is the stator temperature (in critical points), and not the stator current, that is limiting, this offers a number of advantages. The general tendency to set the limiter conservatively can thus be lessened since it is the primary quantity that is known and not a derivative. With a conventional current limiter no consideration can be taken to the temperature of the machine when the current limit is exceeded, i.e. no consideration can be taken to the fact, for instance, that the machine was started shortly before the current limit was exceeded, or that the load was low shortly before. This can be avoided by using stator temperature limit(s) instead. Cooling of the machine is dimensioned so that the stator in continuous rated operation does not exceed a certain temperature—let us call this the rated temperature. This temperature is consciously set conservatively, i.e. the stator (insulation) can withstand higher temperatures for long periods of time. If the temperature in the critical points is known the machine can be run above rated operation for relatively long periods.

Dimensioning the rotor with salient poles (hydroelectric generators) in synchronous machines according to the invention is facilitated by the fact that the inner diameter of the stator can be made larger than in conventional machines since the stator winding is composed of cable in which the insulation takes up more space. It is thus possible to design the stator for this type of synchronous machine in accordance with conventional dimensioning procedures and change only the design of the rotor so that the rotor current limit is raised in the desired manner.

For a synchronous machine incorporating an air-cooled rotor with salient poles, this can be done, for instance, by utilizing the extra space to wind extra turns of the field winding in order to increase the magnetic pole voltage. A certain number of turns in the field winding then consist of cooling turns, thus increasing the cooled surface of the field winding. If the extra turns are provided with the same proportion of cooling turns, as the other turns the temperature increase in the field winding can be kept at the same level as in a conventional dimensioning procedure, despite the magnetic pole voltage being raised.

For a synchronous machine with cylindrical rotor (turbo-rotor) the rotor current limit can be increased by making the machine longer, for instance.

Figure 3A:
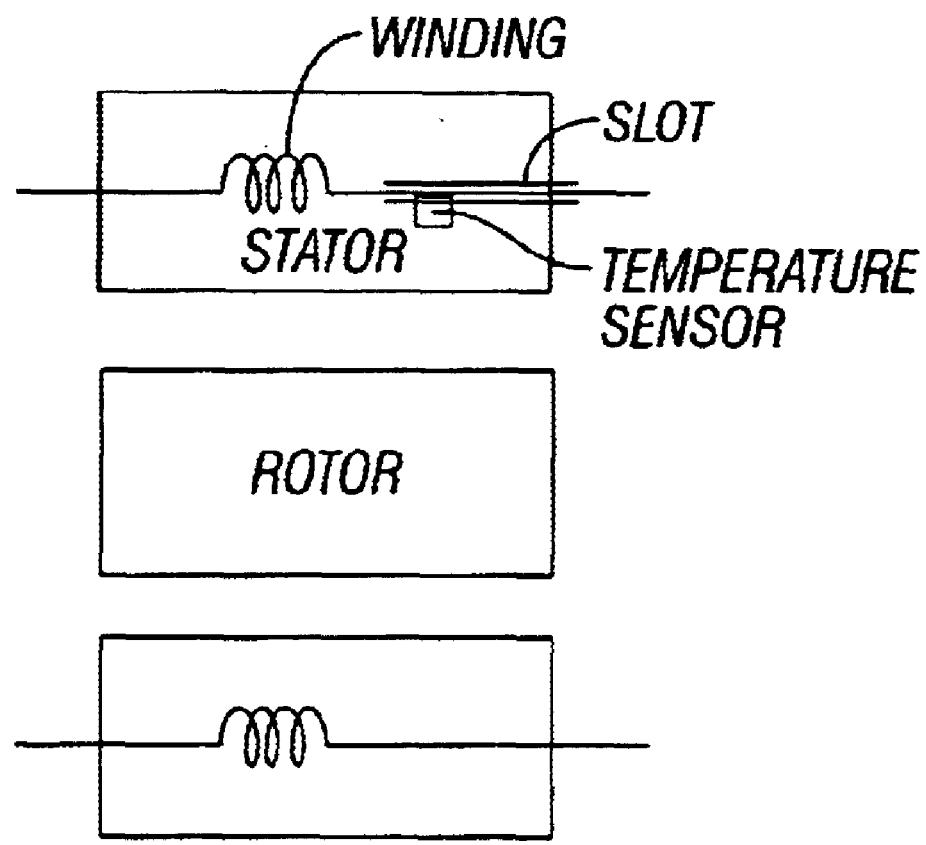

The invention will now be explained in more detail in the following with reference to the accompanying drawings in which FIGS. 1 and 2 show capability graphs for overexcited synchronous machines with conventional dimensioning and in accordance with the invention, respectively, FIG. 3 shows a cross section through the cable used for the stator winding in the synchronous machine according to the invention, FIG. 3A is a schematic illustration of a machine in accordance to the present invention illustrating a stator, rotor, a winding and a temperature sensor in a stator slot, FIGS. 4 and 5 show two embodiments of a temperature estimator in the synchronous machine according to the invention.

Figure 8:
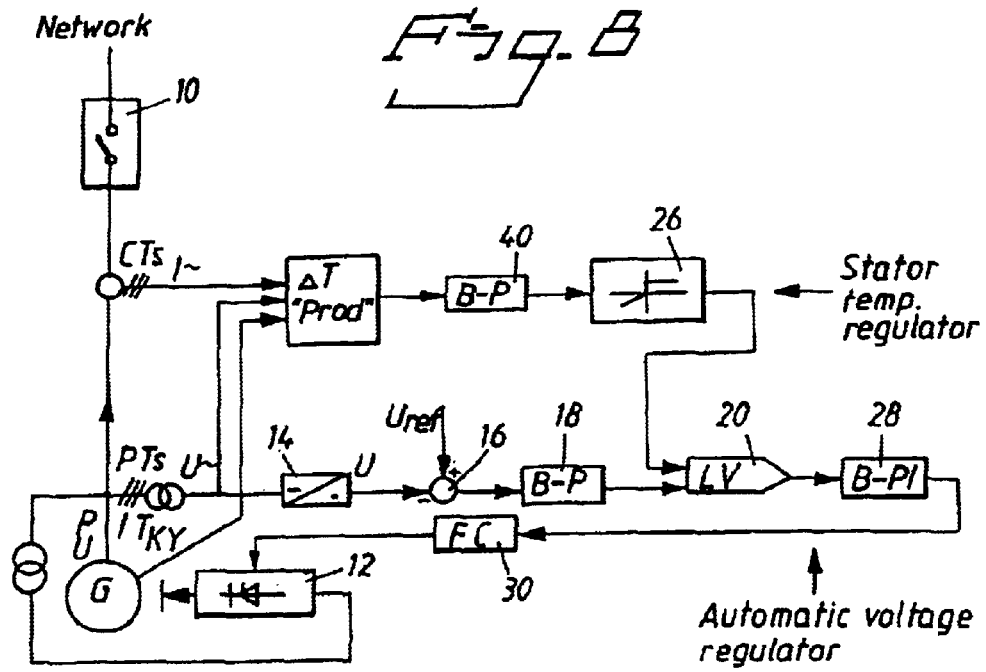
Figure 9:
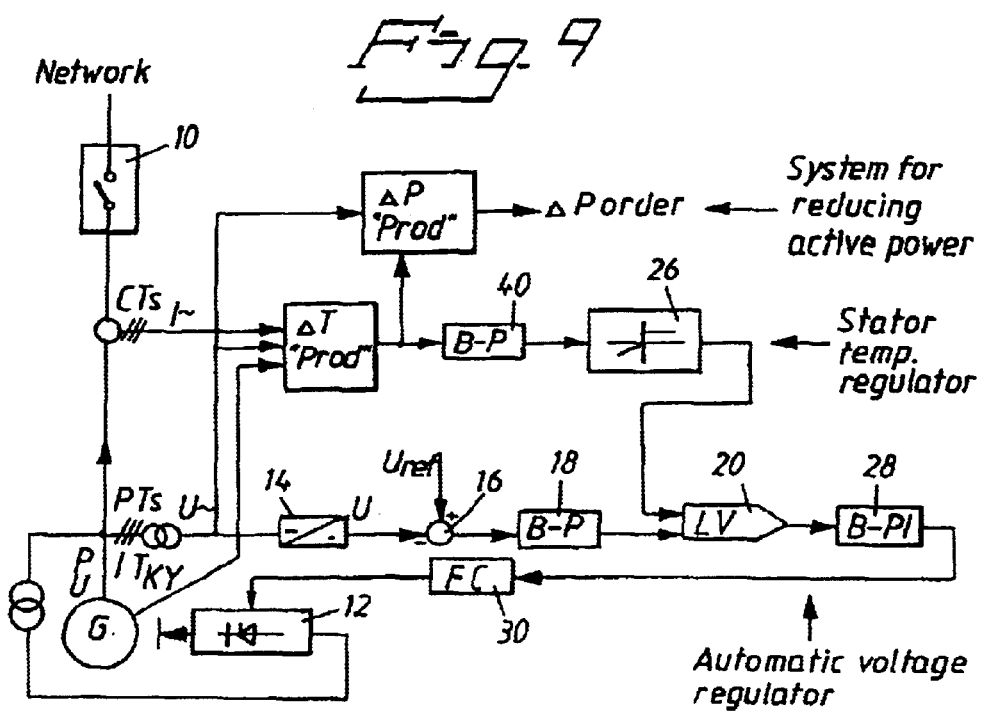

FIG. 6 shows an example of a temperature-monitoring circuit that emits an output signal for further control, and FIGS. 7–9 show various circuits for control of the synchronous machine according to the invention.

FIG. 3 shows a cross section through a cable used in the present invention. The cable is composed of a conductor consisting of a number of strand parts 2 made of copper, for instance, and having circular cross section. This conductor is arranged in the middle of the cable 1 and around the conductor is a first semiconducting layer 3. Around the first semiconducting layer 3 is an insulating layer, e.g. XLPE-insulation, and around the insulating layer is a second semiconducting layer that is normally earthed.

In the machine according to the invention the windings are thus preferably cables of a type having solid, extruded insulation, such as those used nowadays for power distribution, e.g. XLPE-cables or cables with EPR-insulation. Such cables are flexible, which is an important property in this context since the technology for the device according to the invention is based primarily on winding systems in which the winding is formed from cable which is bent during assembly. The flexibility of a XLPE-cable normally corresponds to a radius of curvature of approximately 20 cm for a cable 30 mm in diameter, and a radius of curvature of approximately 65 cm for a cable 80 mm in diameter. In the present application the term "flexible" is used to indicate that the winding is flexible down to a radius of curvature in the order of four times the cable diameter, preferably eight to twelve times the cable diameter.

Windings in the present invention are constructed to retain their properties even when they are bent and when they are subjected to thermal stress during operation. It is vital that the layers retain their adhesion to each other in this context. The material properties of the layers are decisive here, particularly their elasticity and relative coefficients of thermal expansion. In a XLPE-cable, for instance, the insulating layer consists of cross-linked, low-density polyethylene, and the semiconducting layers consist of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^{6}$ ohm-cm, e.g. 1–500 ohm-cm, or 10–200 ohm-cm, naturally also fall within the scope of the invention.

The insulating layer may consist, for example, of a solid thermoplastic material such as low-density polyethylene (LDPE), high-density polyethylene (HDPE), polypropylene (PP), polybutylene (PB), polymethyl pentene (PMP), cross-linked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymers/nitrile rubber, butyl graft polyethylene, ethylene-butyl-acrylate-copolymers and ethylene-ethyl-acrylate copolymers may also constitute suitable polymers for the semiconducting layers.

Even when different types of material are used as base in the various layers, it is desirable for their coefficients of thermal expansion to be substantially the same. This is the case with combination of the materials listed above.

The materials listed above have relatively good elasticity, with an E-modulus of E<500 MPa, preferably <200 MPa. The elasticity is sufficient for any minor differences between the coefficients of thermal expansion for the materials in the layers to be absorbed in the radial direction of the elasticity so that no cracks appear, or any other damage, and so that the layers are not released from each other. The material in the layers is elastic, and the adhesion between the layers is at least of the same magnitude as the weakest of the materials.

The conductivity of the two semiconducting layers is sufficient to substantially equalize the potential along each layer. The conductivity of the outer semiconducting layer is sufficiently great to enclose the electrical field in the cable, but sufficiently small not to give rise to significant losses due to currents induced in the longitudinal direction of the layer.

Thus, each of the two semiconducting layers essentially constitutes one equipotential surface and the winding, with these layers, will substantially enclose the electrical field within it.

There is, of course, nothing to prevent one or more additional semiconducting layers being arranged in the insulating layer.

As mentioned above, the stator current limit is thermally restricted in the present invention. It is the insulation 4 that sets the limit in the first place. If a cable with XLPE-insulation is used, the temperature of the layer between the conductor and the insulation should not exceed 90° C., which is the maximum temperature at rated operation and normal location in earth, for instance, i.e. the insulation can withstand this temperature for several hours and it may be briefly somewhat exceeded. The temperature of the surface layer between the insulation and the iron in the stator should not exceed a temperature limit of typically 55° C., i.e. the temperature difference over the insulation will be at least 35° C.

A synchronous machine according to the invention is schematically illustrated in FIG. 3A wherein the machine includes a rotor R, stator S, a winding W and one or more temperature determining members or sensor T. The machine may be dimensioned for a temperature of 70–80° C. in the conductor and a core temperature of 40–50° C. at rated operation. These temperatures are extremely dependent on the temperature of the coolant. A cooling machine may be used to lower this temperature although in normal operation this has a negative effect on the degree of efficiency. On the other hand, connection of such a machine may be justified in an emergency situation, although it must be taken into consideration that it may take relative.

In order to make maximum use of the thermal inertia in the stator in a synchronous machine according to the invention it is desirable for the surrounding conductor and iron temperatures to be determined in the part of the insulation most critical from the heating aspect. This can be achieved by direct measurement using measuring devices, or with a temperature estimator of the type shown in FIG. 4. It is also possible to combine temperature measurement and temperature estimation according to FIG. 5.

In FIG. 4 losses in conductors caused by the stator current, and thus dependent on the machine's loading, are represented by a current source PLE, and the core losses caused by the flux (voltage), which are more or less constant irrespective of the load, by a current source $P_{FE}$. The temperature of the coolant is represented by the voltage source $T_{KY}$. $R_{R+S}$ represents thermal resistance for cooling tubes and silicon filling, $R_{ISO}$ thermal resistance for the insulation and $C_{LE}$, $C_{ISO}$ and $C_{FE}$, the thermal capacitance for conductor, insulation and core. $T_{LE}$ in point 54 represents the temperature in the conductor and $T_{ISO}$ in point 52 the mean temperature of the insulation. The model shown in FIG. 4 can be calibrated by comparison of $T_{FE}$ with directly measured iron temperature. The temperature $T_{LE}$ is relatively difficult and expensive to measure directly since the conductor is normally at high potential.

The model shown in FIG. 4 can also be refined by dividing the thermal resistance between conductor and iron into several resistances connected in series, which would correspond to different radii of the insulation. By placing a capacitance from a point between each consecutive resistance and a reference temperature, 0° C., any temperature dependence of the thermal capacitance of the insulation can be modelled more precisely. Since a temperature gradient exists in the insulation, such a division would result in a somewhat improved result.

In FIG. 4 the temperatures $T_{LE}$, $T_{ISO}$ and $T_{FE}$ are considered as states whereas $T_{KY}$, $P_{LE}$ and $P_{FE}$ are considered as input signals. The initial state values are needed to start the temperature estimator and the estimator is normally started simultaneously with the machine, i.e. from cold machine.

The number of nodes can of course be increased, but the embodiments described in connection with FIG. 4 and below in connection with FIG. 5 are to be preferred.

FIG. 5 shows a modification of the temperature estimator in FIG. 4, in which the iron temperature $T_{FE}$ is measured directly. The iron temperature will then be represented by a voltage source $T_{FE}$ in the thus simplified diagram, and serves as input signal, together with $P_{LE}$. The temperatures $T_{ISO}$ and $T_{LE}$ constitute states and are obtained in the points 52 and 54 in the same way as in FIG. 4.

The copper losses are dependent on the stator current and thus on how heavily loaded the machine is. The iron losses are dependent on the flux, which is more or less constant at terminal voltage, depending on the load. The time constant for the temperature increase and cooling of the core circuit is, on the other hand, extremely large in this type of machine and the machine therefore has greater overload capacity if it has just been started.

Both the iron losses and the copper losses will decrease if the field is reduced.

An advantage of the synchronous machine according to the invention in comparison with a conventional machine is that the electric losses are more associated with the flux in the core than with currents in the conductors in the armature circuit. The core losses are developed at earth potential, which facilitates normal cooling and even forced cooling with cooling machines. The conductors of the armature circuit have relatively low current density and the losses on the high-voltage potential are relatively small.

The time constant for heating—and thus cooling—the core circuit is extremely large. Calculations show that the adiabatic temperature increase occurs in the order of hundredths of °K/s. The temperature increase in the armature circuit is also somewhat elevated as a result of the great thermal resistance in the solid insulation of the winding cable. At the current densities in question the adiabatic temperature increases by 1/30 to 1/100°K/s, while conventional machines have an adiabatic temperature increase in the order of 1/10 °K/s. Both the temperature in the conductor $T_{LE}$, and in the core $T_{FE}$ must be monitored and FIG. 6 illustrates an example of a monitoring circuit that emits an output signal for further control. This circuit thus comprises a temperature estimator 2 according to FIG. 4, to which the input magnitudes I (stator current), U (terminal voltage) and $T_{KY}$ are supplied. The output signals $T_{LE}$, and $T_{FE}$ are obtained from the estimator 2, these being compared at 4 and 6, respectively, with pre-set limit values $T_{L,LE}$, and $T_{L,FE}$, as mentioned above, and the result of the comparison is supplied to a gate 8 (Lowest Value Gate). This gate emits a control signal at its output constituting the temperature difference between temperature and temperature limit which is greatest in absolute terms. If $T_{FE}$ is measured directly, only $T_{LE}$, need be determined from I and $T_{FE}$ with the aid of the temperature estimator. If both $T_{FE}$ and $T_{LE}$, are measured directly, no temperature estimator is required and the measured temperatures are instead compared directly with the limit values.

FIG. 7 shows in block diagram form an example of a 2: control circuit for reducing the active power if the stator current exceeds a maximum permissible limit value.

A synchronous generator G is connected to a power network via a breaker 10. The generator G is excited via a thyristor-rectifier 12. The voltage U is supplied via a voltage transformer $PT_S$ to a measured value converter 14, a unit $I_L$"Prod" for determining of the actual stator current limit $I_L$, and to a unit ΔP"Prod" for generating a signal "ΔP order" for reducing the active power if the stator current exceeds the stator current limit. In the same way, the current I~ is supplied via a current transformer $CT_S$ to the units $I_L$ "Prod" and "ΔP Prod". In the unit $I_L$ "Prod" the direction of the reactive power, voltage drop and initial time delay allowed for reducing the field are taken into consideration when determining the stator current limit. The stator current limit is based on the stator temperature at rated operation ($T_{LE}$, =70–80° C. and $T_{FE}$=40–50° C. with XLPE-insulation). The rate of reduction and maximum range for the reduction of the active power is also determined in the unit ΔP"Prod", as well as a function, if any, for returning to the active power production the synchronous machine had before the stator current limit was exceeded, if the reactive power requirement of the system again decreases.

The maximum reactive power the synchronous machine in the embodiment described can produce in steady state operation is equivalent to 100% of rated power and is obtained when the active power has been reduced to zero. However, there is cause to introduce a lower limit greater than zero for reducing of active power, since further reduction of active power gives little in return of increased ability to produce reactive power, see FIG. 2. If more reactive power is required in steady state operation, this must be meet by a reduction of the field after an appropriate time delay.

The output signal U from the network converter 14 is compared at 16 with a predetermined reference value $U_{REF}$ and the result of the comparison is supplied to an amplifier and signal-processing unit 18 before being supplied to a gate 20.

At 22 the stator current I is compared with the stator current limit $I_L$ generated in the unit $I_L$"Prod", and the result of the comparison is supplied to an amplifier and signal-processing unit 24 and a subsequent block 26 with non-linear characteristic. The non-linear characteristic is such that a large output signal is obtained for positive input signals and an output signal proportional to the input signal for negative input signals. The output signal from the block 26 is also supplied to the gate 20 which is a Lowest Value Gate, i.e. the signal that is lowest is obtained as output signal.

The output signal from the gate 20 is supplied to a signal-processing unit 28 with integrating action which is in turn connected to a trigger circuit 30 for the rectifier 12 of the excitation machine.

The control circuit in FIG. 7 comprises essentially three main parts: an automatic voltage regulator, a stator current limiter and a system for reducing the active effect in order to increase the ability of the synchronous machine to meet the system's demand for reactive effect at the desired voltage level.

Reduction of the field current can be achieved in several ways according to the invention. A traditional limiter may thus be used that operates on the principle that if the stator current exceeds the stator current limit during a maximum permissible period, the field current is lowered e.g. ramped in accordance with a selected ramp function, (not shown) until the stator current becomes equal to the stator current limit.

The actual control may be effected in various ways. In this case the initial time delay must be at least long enough to ensure that brief large currents arising out of error conditions in the system do not cause reduction of the field because the current limit has been exceeded. Various methods of time delay are possible, e.g. a constant delay time irrespective of by how much the current exceeds the limit, or inverse time characteristic, i.e. the more the current exceeds the limit, the shorter the time delay. If the stator current limit has been exceeded, a period of time must be allowed for cooling. The type of synchronous machine under consideration has large time constants with regard to heating and cooling of the stator and the time delay can therefore be large in comparison with in the case of a conventional machine. This is because time is allowed either to reduce the system's demand for reactive power or increase the machine's ability to produce reactive power.

The dimensioning of the machine, together with reduction of active power increases the machine's ability to produce reactive power.

According to the invention reduction of the field current is also possible starting from the temperature at the most critical points. The temperature of the conductor in the stator and the core temperature in the stator at the most critical points can be determined either through direct measurement, which may be difficult in the case of conductor temperature, or with the aid of a temperature estimator with copper losses (stator current), iron losses (voltage) and coolant temperature as input signals, as discussed above. Two modes are thus possible for control, namely:

1) if the temperatures are below their maximum permissible temperature limits the field current is controlled so that the terminal voltage becomes equal to the desired operating voltage, and
2) if the terminal voltage is less than the desired operating voltage, the field current is controlled so that the conductor temperature or core temperature becomes equal to the maximum permissible temperature limit and the other temperature is below its limit.

The machine of the invention is capable of operating at overload with the stator current exceeding the thermally based stator current limit by at least 30 percent for at least three minutes.

The machine of the invention is capable of operating at overload with the stator current exceeding the thermally based stator current limit by at least 30 percent for at least three minutes without thermal damage wherein the machine has achieved rated temperature prior to the overload condition. In another embodiment, the machine is capable of operating as above with the stator current exceeding the thermally based stator current limit by at least 30 percent for at least five minutes without thermal damage. In yet another embodiment, the machine is operable as above with the stator current exceeding the thermally based stator current limit by at least 50 percent for at least fifteen minutes without thermal damage. In yet another embodiment, the machine is operable as above with the stator current exceeding the thermally based stator current limit by at least 80 percent for at least fifteen minutes without thermal damage.

The transition point where the stator temperature is equal to the maximum permissible stator temperature and the terminal voltage is equal to the desired operation voltage can be realized with a Lowest Value Gate, as described in connection with the figure.

Mode 1 above corresponds to normal voltage control, whereas mode 2 protects the machine against high temperatures since terminal voltage and stator temperature decrease when the field current decreases.

FIG. 8 shows a control circuit for achieving control of the above-mentioned type.

Besides the current I~ and the voltage U~, the unit ΔT"Prod" is also supplied with the temperature $T_{KY}$ of the coolant. The output signal from the unit ΔT"Prod" is supplied to an amplifier and signal-processing unit 40 and the block 26 with non-linear characteristic, as described earlier, for supply to the gate 20 together with the processed and amplified output signal from comparison of the voltage U with desired operation voltage Uref. Depending on the output signal from the gate 20, control of the machine is then carried out in a manner corresponding to that described in the embodiment according to FIG. 7.

If the limiting temperature ($T_{LE}$ or $T_{FE}$) approaches its maximum temperature limit (e.g. $T_{L,LE}$=90° C. and $T_{L,FE}$=55° C. with XLPE-insulation) with a time derivative greater than zero, the above control may result in an "over-swing" in the temperature. If this over-temperature is brief, and providing it is moderate, it does not constitute a serious risk to the insulation. However, it may result in a temporary voltage drop that may upset the stability of the power system, as a result of the control circuit attempting to counteract the over-temperature by reducing the field.

To avoid this, the control circuit may be supplemented with a temperature predicting circuit, e.g. based on the time derivative of the temperature, so that even before maximum temperature is reached, the voltage is permitted to gently start falling. The "over-swing" in temperature will then be slight, or altogether eliminated.

The voltage will thus commence falling earlier, but not so quickly.

A comparison between a traditional current limiter according to FIG. 7 and a stator temperature limiter according to FIG. 8 shows the latter to have the advantage of allowing overload over a long period of time, in the order of hours, whereas the traditional current limiter only permits overload for a short period of time, in the order of seconds–minutes.

If the machine is equipped with stator temperature limiters, however, a warning signal should be sent to the operating centre as soon as the temperature for rated operation is exceeded, since this indicates that an overload situation exists and should be remedied.

FIG. 9 shows a further development of the control circuit in FIG. 7. Here a restricted control based on the temperature, aimed at maintaining the terminal voltage at as acceptable a level as possible for as long as possible by utilizing the thermal capacity of the stator to the maximum, is combined with a control of active and reactive power.

An output signal is thus generated in the unit ΔT"Prod" in the same way as in the circuit according to FIG. 8. This signal is supplied to the amplifier and signal-processing unit 40, block 26 and gate 20 to achieve the same limiting control as in FIG. 8. The output signal from the unit ΔT"Prod" is also supplied to the unit ΔP"Prod", together with the voltage U~, whereupon a control signal ΔP order is obtained as output signal from the unit ΔP"Prod" in order to reduce the active power to U=ref, i.e. the terminal voltage equal to desired operating voltage or until the active power reaches a predetermined minimum power limit, as mentioned earlier. The reduction of active power is preferably commenced when either the core or the conductor temperature exceeds the temperatures the machine is dimensioned for.

Yet another control possibility is based on starting a cooling machine to lower the iron and copper temperatures when either a current or temperature limit is reached. This enables the machine to be loaded further.

What is claimed is:

1. A synchronous machine having a rated power factor comprising:
    a stator and a rotor, each having a corresponding thermally based stator current limit and rotor current limit, and
    a stator winding and a rotor field winding, wherein said stator winding comprises
    a flexible high voltage cable having a selected cable radius, including a conductor formed of a plurality of conductor strands, an inner layer having semiconducting properties surrounding and contacting the conductor, a solid insulation surrounding and attached to the inner layer and an outer layer having semiconducting properties surrounding and attached to the solid insulation, said cable having a flexibility sufficient to achieve a bending radius of the cable of about 4 to about 12 times the cable radius without causing detachment of the inner layer, the solid insulation and the outer layer,
    the rotor current limit intersecting the stator current limit at a power factor below the rated power factor, and the stator current limit being above the stator current limit in a capability graph of the machine, and
    means responsive to the stator temperature for limiting the stator current to avoid thermal damage to the stator winding and the rotor winding.

2. A synchronous machine according to claim 1, wherein the means for limiting currents comprises at least one of temperature-determining member to determine the temperature of the stator located at a point critical to heating, and a current measuring device and a voltage measuring device for measuring stator current and voltage, and a control circuit responsively connected thereto, to reduce the at least one of active power and field current, if one of the temperature and stator current and stator voltage exceeds predetermined limit values.

3. A synchronous machine as claimed in claim 2, wherein the temperature-determining members comprise at least one measuring device arranged at a point in the stator that is susceptible to heating, in order to measure the temperature thereat.

4. A synchronous machine as claimed in claim 3, wherein the measuring device is located on a slot wall inside a winding slot in the stator.

5. A synchronous machine as claimed in claim 2, wherein the temperature-determining members comprise a temperature estimator arranged to determine the temperature of the stator at a critical point for heating, in order to induce the control circuit to reduce the field current if the temperature determined exceeds a predetermined limit value.

6. A synchronous machine as claimed in claim 2, wherein the temperature-determining members comprise temperature estimators arranged to determine the temperature in the cable.

7. A synchronous machine as claimed in claim 2, wherein the control circuit is responsive to commence reduction of the field current at a selected temperature below a maximum permissible stator temperature.

8. A synchronous machine as claimed in claim 2, wherein the control circuit is responsive to commence reduction of active power after the temperature has been above a rated operating temperature below a maximum permissible stator temperature, for a predetermined period of time.

9. A synchronous machine as claimed in claim 1, wherein the control circuit is responsive to control the field current if the stator current executes the stator current limit so that the terminal voltage of the machine is equal to a desired operating voltage if the time during which the stator current has been above the stator current limit is shorter than a maximum permissible time, and, if the maximum permissible time has been exceeded, the control circuit is responsive to reduce the field current until the stator current becomes equal to the stator current limit.

10. A synchronous machine as claimed in claim 9, wherein the control circuit is responsive to commence reduction of the field current with a selected time delay after the stator current limit has been exceeded.

11. A synchronous machine as claimed in claim 1, wherein the field winding includes a number of extra turns in order to increase the magnetic pole voltage.

12. A synchronous machine as claimed in claim 11, wherein a selected proportion of the extra turns are in the form of cooling turns for the winding.

13. A synchronous machine as claimed in claim 1, wherein the field winding includes increased conducting area to produce a relatively low current density in the winding.

14. A synchronous machine as claimed in claim 1, including cooling means for the field winding.

15. A synchronous machine as claimed in claim 1, comprising a cooling machine connectable therein to produce forced cooling.

16. A synchronous machine as claimed in claim 1, wherein the high-voltage cable has a diameter of about 20 mm to about 2000 mm and a conducting area of about 80 $mm^2$ to about 3000 $mm^2$.

17. A synchronous machine as claimed in claim 16, wherein said layers comprise materials having selected elasticity and selected coefficients of thermal expansion such that changes in volume in the layers caused by temperature fluctuations during operation are absorbed by the elasticity of the material so that the layers retain their adhesion to each other.

18. A synchronous machine as claimed in claim 16, wherein the materials in said layers have an E-modulus less than about 500 Mpa.

19. A synchronous machine as claimed in claim 16, wherein the coefficients of thermal expansion for the materials in said layers are of substantially the same magnitude.

20. A synchronous machine as claimed in claim 16, wherein the respective materials each have at least a selected strength such that the adhesion between the layers is of at least the same magnitude as the selected strength.

21. A synchronous machine as claimed in claim 16, wherein each of the semiconducting layers comprises an equipotential surface.

22. A synchronous machine as claimed in claim 1, wherein the rotor includes salient poles.

23. A synchronous machine as claimed in claim 1, wherein the rotor is cylindrical.

24. A synchronous machine as claimed in claim 16, wherein the materials in said layers have an E-modulus less than about 200 Mpa.

25. A method for control of a synchronous machine according to claim 1, wherein the machine operates with the stator current exceeding the thermally based stator current limit for a time period less than a selected maximum permissible time limit, whereafter overload is reduced by reduction at least one of active power and the field current.

26. A method according to claim 25, wherein the machine is capable of operating at overload with the stator current exceeding the thermally based stator current limit by at least 30% for at least 3 minutes without thermal damage, wherein the machine has achieved rated temperature prior to the overload.

27. A method according to claim 25, wherein the machine is capable of operating at overload with the stator current exceeding the thermally based stator current limit by at least 30% for at least 5 minutes without thermal damage, wherein the machine has achieved rated temperature prior to the overload.

28. A method according to claim 25, wherein the machine is capable of operating at overload with the stator current exceeding the thermally based stator current limit by at least 50% for at least 5 minutes without thermal damage, wherein the machine has achieved rated temperature prior to the overload.

29. A method according to claim 25, wherein the machine is capable of operating at overload with the stator current exceeding the thermally based stator current limit by at least 80% for at least 15 minutes without thermal damage, wherein the machine has achieved rated temperature prior to the overload.

30. A method according to claim 25, wherein the cable comprises a conductive core and an electric field confining insulating covering surrounding the core.

31. A method for controlling a synchronous machine comprising a stator with a stator winding and a rotor with a field winding, wherein the stator winding is wound of a high voltage cable formed with a selected cable radius, including a conductor formed of a plurality of conductive strands, an inner layer having semiconducting properties surrounding and contacting the conductor, a solid insulation surrounding and attached to the inner layer and an outer layer having semiconducting properties surrounding and attached to the solid insulation, forming said cable with a flexibility sufficient to achieve a bending radius of the cable of about 4 to about 12 times the cable radius without causing detachment of the inner layer, the solid insulation and the outer layer, and in the rotor the field winding has thermally based rotor and stator current limits intersecting each other in a capability graph at a power factor value below a rated power factor value of the machine, and comprising the step of reducing active power if the stator current increases sufficiently to incur risk of thermal damage.

32. A method as claimed in claim 31, wherein when the stator current exceeds the stator current limit for a predetermined maximum permissible time, if the stator current is above the stator current limit, reducing active power until the stator current becomes equal to the stator current limit, if the time during which the stator current has been above the stator current limit is shorter than said maximum permissible time.

33. A method as claimed in claim 32, wherein if the stator current is above the stator current limit for a time exceeding the maximum permissible time, reducing the active power and the field current until the stator current is equal to the stator current limit.

34. A method as claimed in 32, a further including selecting the limit value for the power factor to zero.

35. A method as claimed in claim 31, further including reducing the active power in accordance with a ramp function.

36. A method as claimed in claim 35, further including selecting a derivative for the ramp function to avoid power oscillations on the electric power network and preventing damage to turbines and other parts of the electric power production plant in which the synchronous machine is operated.

37. A method as claimed in claim 35, further including selecting a derivative for the ramp function, which is dependent on a time constant for warming up the stator.

38. A method as claimed in claim 35, further including reducing the active power such that an acceptable terminal voltage is maintained on the machine.

39. A method as claimed in claim 31, further including reducing the active power in accordance with a ramp function, if the stator current has exceeded the stator current limit but is below a predetermined second limit value above the stator current limit, and reducing the active power as fast as possible if the stator current exceeds said second limit value.

* * * * *